United States Patent
Dall'Aglio

(10) Patent No.: US 6,931,749 B2
(45) Date of Patent: Aug. 23, 2005

(54) APPARATUS AND METHODS FOR MEASURING THE PIN DIAMETER OF A CRANKSHAFT AT THE PLACE OF GRINDING

(75) Inventor: Carlo Dall'Aglio, Castello d'Argile (IT)

(73) Assignee: Marposs Societa' per Azioni (IT)

( * ) Notice: Subject to any disclaimer, the term of this patent is extended or adjusted under 35 U.S.C. 154(b) by 0 days.

(21) Appl. No.: 10/203,155

(22) PCT Filed: Feb. 22, 2001

(86) PCT No.: PCT/EP01/02022

§ 371 (c)(1),
(2), (4) Date: Aug. 6, 2002

(87) PCT Pub. No.: WO01/66305

PCT Pub. Date: Sep. 13, 2001

(65) Prior Publication Data

US 2003/0009895 A1 Jan. 16, 2003

(30) Foreign Application Priority Data

Mar. 6, 2000 (IT) .................................... BO2000A0113

(51) Int. Cl.[7] .............................. G01B 7/12; B24B 49/04
(52) U.S. Cl. ....................................... 33/555.3; 33/702
(58) Field of Search ............................. 33/555.1, 555.2, 33/605, 657, 702, 706

(56) References Cited

U.S. PATENT DOCUMENTS

| | | | | |
|---|---|---|---|---|
| 4,141,149 A | * | 2/1979 | George et al. .............. | 33/555.3 |
| 4,596,076 A | | 6/1986 | Sigg | |
| 4,819,195 A | * | 4/1989 | Bell et al. ...................... | 702/95 |
| 5,021,650 A | * | 6/1991 | Rieder et al. ........... | 250/231.16 |
| 5,136,527 A | * | 8/1992 | Koretz ........................ | 702/168 |
| 5,150,545 A | * | 9/1992 | Esteve ........................... | 451/8 |
| 5,479,096 A | * | 12/1995 | Szczyrbak et al. .......... | 324/132 |
| 5,551,814 A | * | 9/1996 | Hazama ...................... | 409/200 |
| 5,771,599 A | * | 6/1998 | Uchimura et al. ............ | 33/657 |

(Continued)

FOREIGN PATENT DOCUMENTS

| | | |
|---|---|---|
| EP | 0 322 120 A2 | 6/1989 |
| EP | 0 480 222 A2 | 4/1992 |
| EP | 0 810 067 A1 | 12/1997 |
| WO | WO 83/04302 | 12/1983 |
| WO | WO 90/00246 | 1/1990 |
| WO | WO 97/12724 | 4/1997 |
| WO | WO 9947884 A1 * 9/1999 | ............ G01B/7/00 |

OTHER PUBLICATIONS

International Search Report mailed Jun. 22, 2001, corresponding International Application PCT/EP01/02022.

*Primary Examiner*—R Alexander Smith
(74) *Attorney, Agent, or Firm*—Dickstein, Shapiro, Morin & Oshinsky LLP

(57) ABSTRACT

An apparatus for checking diametral dimensions of crankpins and main journals in the course of grinding is provided. The apparatus includes a head with a Vee-shaped reference device and an axially movable feeler that contacts the surface of the pin to be checked, and an articulated support device, coupled to the grinding wheel slide that carries the head and enables it to keep contact with the surface of the pin during possible orbital rotations. A transducer in the head cooperates with the feeler for detecting its displacements and transmits signals to a processing and display device in turn connected with the computer numerical control of the grinding machine. The processing and display device processes the transducer signals with compensation values or coefficients stored in a memory unit for obtaining measuring signals output by the head that vary in a linear way in a wide range and for compensating errors due to temperature variations.

12 Claims, 6 Drawing Sheets

U.S. PATENT DOCUMENTS

| | | | | |
|---|---|---|---|---|
| 5,902,925 A | * | 5/1999 | Crispie et al. | 73/1.88 |
| 5,914,593 A | * | 6/1999 | Arms et al. | 324/207.12 |
| 5,956,659 A | * | 9/1999 | Spies et al. | 702/94 |
| 6,029,363 A | * | 2/2000 | Masreliez et al. | 33/706 |
| 6,067,721 A | * | 5/2000 | Dall'Aglio et al. | 33/555.1 |
| 6,116,269 A | * | 9/2000 | Maxson | 137/487.5 |
| 6,167,634 B1 | * | 1/2001 | Pahk et al. | 33/702 |
| 6,266,570 B1 | * | 7/2001 | Hocherl et al. | 700/54 |
| 6,304,827 B1 | * | 10/2001 | Blixhavn et al. | 702/104 |
| 6,321,171 B1 | * | 11/2001 | Baker | 702/104 |
| 6,415,200 B1 | * | 7/2002 | Kato et al. | 700/193 |
| 6,487,787 B1 | * | 12/2002 | Nahum et al. | 33/706 |
| 6,487,896 B1 | * | 12/2002 | Dall'Aglio | 73/104 |
| 6,848,190 B2 | * | 2/2005 | Dall'Aglio et al. | 33/555.3 |
| 2003/0009895 A1 | * | 1/2003 | Dall'Aglio | 33/555.3 |
| 2003/0056386 A1 | * | 3/2003 | Danielli et al. | 33/555.1 |

* cited by examiner

APPARATUS AND METHODS FOR MEASURING THE PIN DIAMETER OF A CRANKSHAFT AT THE PLACE OF GRINDING

TECHNICAL FIELD

The invention relates to an apparatus for checking the diameter of pins, rotating about a geometrical axis, in the course of the machining in a numerical control grinding machine including a worktable, defining said geometrical axis and a grinding wheel slide carrying a grinding wheel, with a measuring head including a Vee-shaped reference device for cooperating with the pins to be checked, a feeler for contacting the surfaces of the pins to be checked and performing translation displacements substantially along the bisecting line of the Vee-shaped reference device, and a transducer for generating signals depending on the position of the feeler with respect to the Vee-shaped reference device, a support device, adapted to be coupled to the grinding wheel slide, including reciprocally movable coupling elements, for supporting the measuring head in a movable way, a control device for controlling automatic displacements of the measuring head from a rest position to a checking condition and vice versa, and a processing and display device connected to the measuring head for receiving and processing the signals provided by the transducer.

BACKGROUND ART

Apparatuses with these characteristics, for the diameter checking of crankpins rotating with orbital motion about a geometrical axis, are disclosed in international patent application published with No. WO-A-9712724.

The embodiments described in such international patent application guarantee excellent metrological results and small forces of inertia, and the standards of performance of the apparatuses with these characteristics, manufactured by the company applying for the present patent application, confirm the extraordinary quality and the reliability of the applications.

Moreover, these known apparatuses provide remarkable flexibility of use, also thanks to the possibility of replacing—by performing simple operations—some components, as the Vee-shaped reference device for varying, for example, the measurement range of the head. However, these known apparatuses do not enable to check in an automatic and sequential way the machining of parts differing among each other insofar as their nominal dimensions are concerned (for example the crankpins and the main journals of a same crankshaft), as this would imply the need to replace the Vee-shaped reference devices in between a checking and a subsequent one or at least carry out a new head calibration on a suitable section of a master piece every time the nominal dimension changes.

DISCLOSURE OF THE INVENTION

Object of the present invention is to provide an apparatus for the checking of pins rotating in the course of the machining in a machine tool, for example during the in-process checking in a grinding machine for grinding crankpins rotating with an orbital motion and/or main journals rotating about their symmetry axis, that enables to check in a simple and rapid way pins having nominal diametral dimensions varying within a relatively wide range.

This object is achieved by a checking apparatus of the hereinbefore mentioned type, wherein the processing and display device includes a memory unit for storing compensation values or coefficients in connection with the signals of the transducer, the processing and display device being adapted to process the transducer signals and corresponding compensation values or coefficients and provide measuring signals.

Thus, by compensating transducer errors, it is possible to attain a wide transducer linearity range and corresponding measurement displacements of the feeler of a considerable entity. In this way, the choice for determining the appropriate angle defined by the sides of the Vee-shaped reference device, permitting the head to have a wide measurement range, is not substantially bound to the need of limiting the feeler displacements but it can be made by taking into due consideration other physical or functional characteristics of the application.

Moreover, wider feeler displacements enable to achieve, at an identical measurement range, an improved sensitivity of the head and a higher resolution of the apparatus.

BRIEF DESCRIPTION OF THE DRAWINGS

The invention is now described in detail with reference to a preferred embodiment, illustrated in the enclosed sheets of drawings, given by way of non-limiting example, wherein.

BEST MODE FOR CARRYING OUT THE INVENTION

Figure 1:
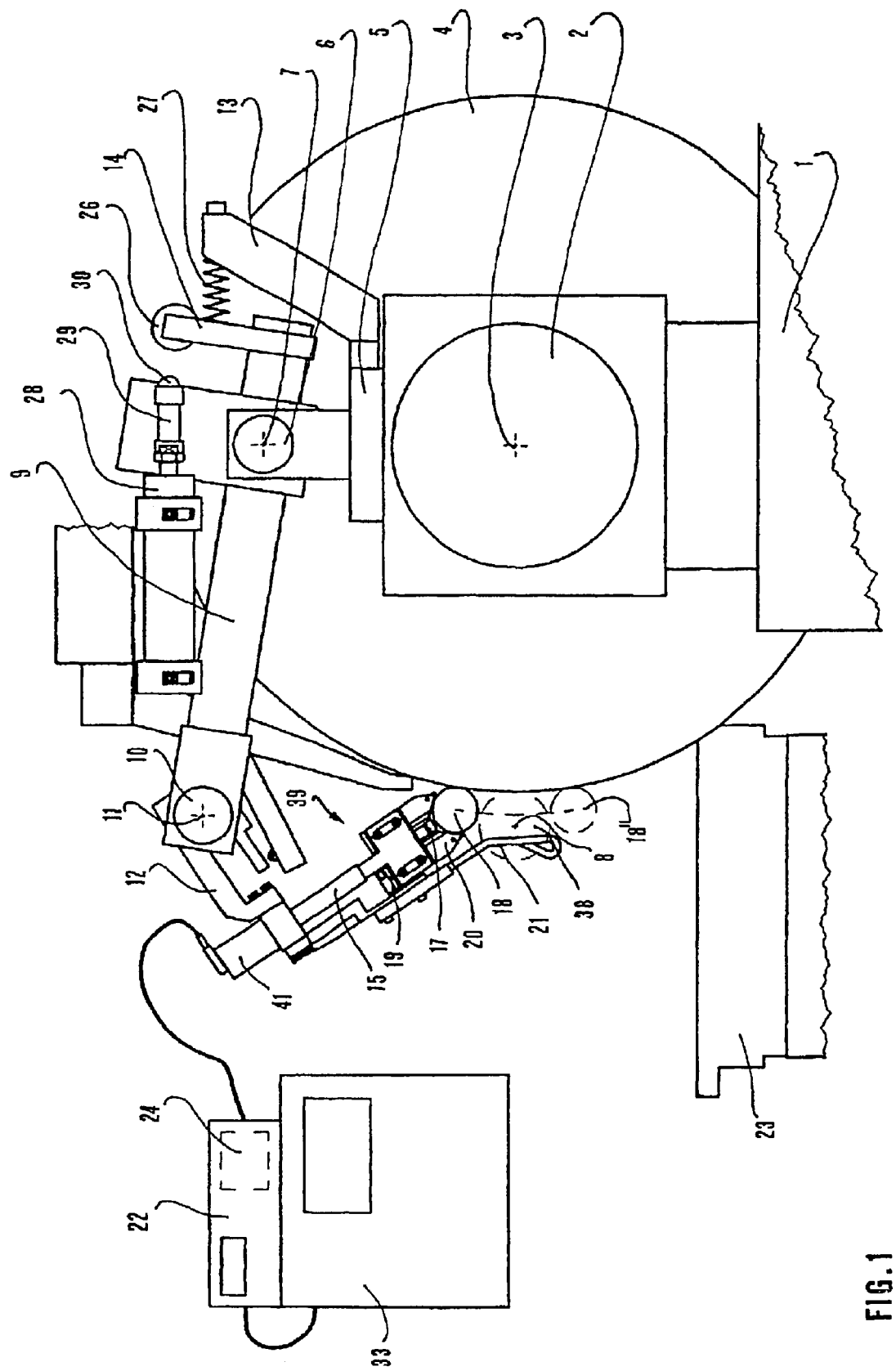
FIG. 1 is a side view of a measuring apparatus mounted on a grinding wheel slide of a machine for grinding crankshafts, shown in a working condition in the course of the checking of a crankpin.
Figure 2:
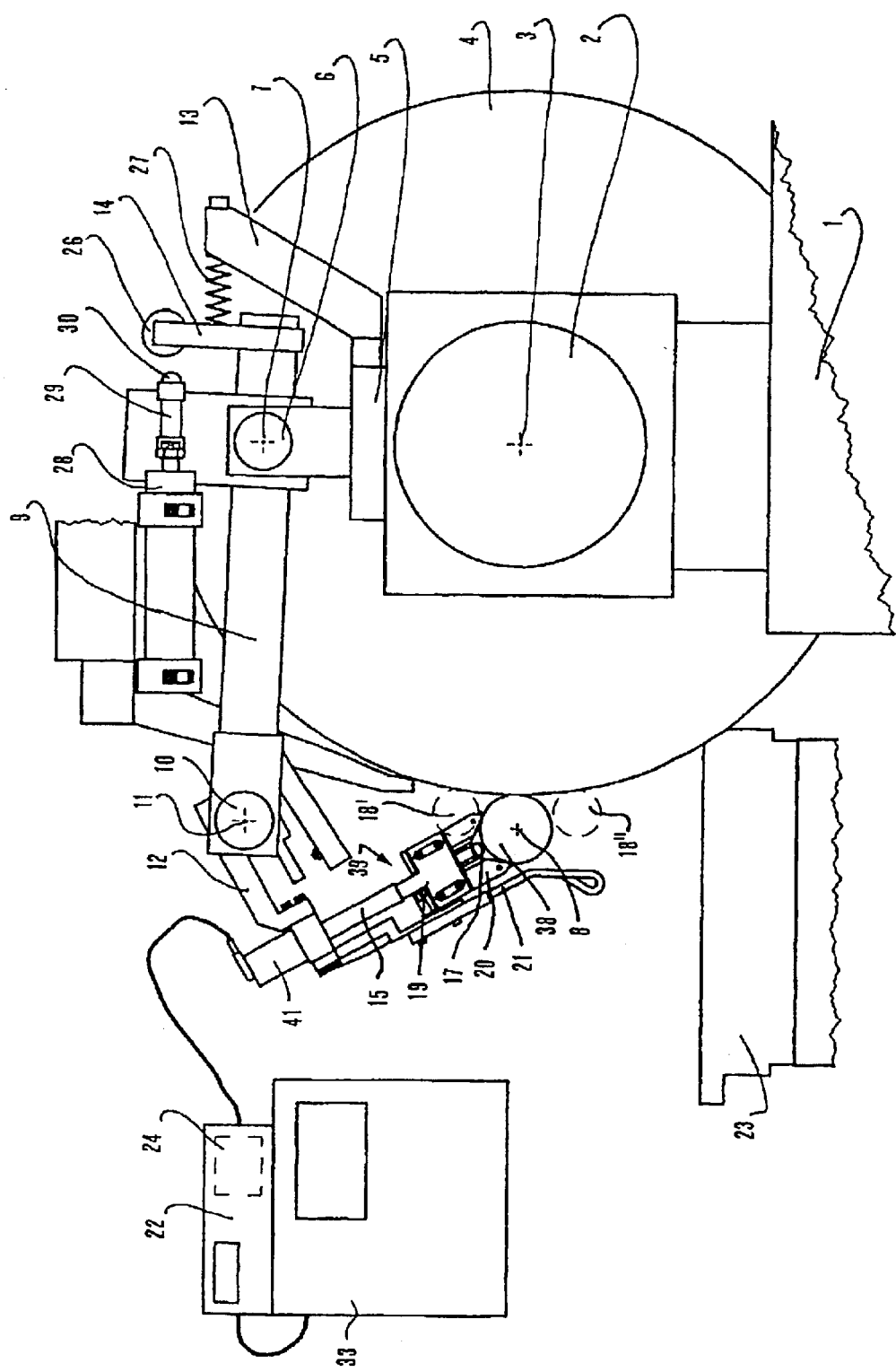
FIG. 2 is a side view of the measuring apparatus of FIG. 1, shown in a working condition in the course of the checking of a main journal.
Figure 3:
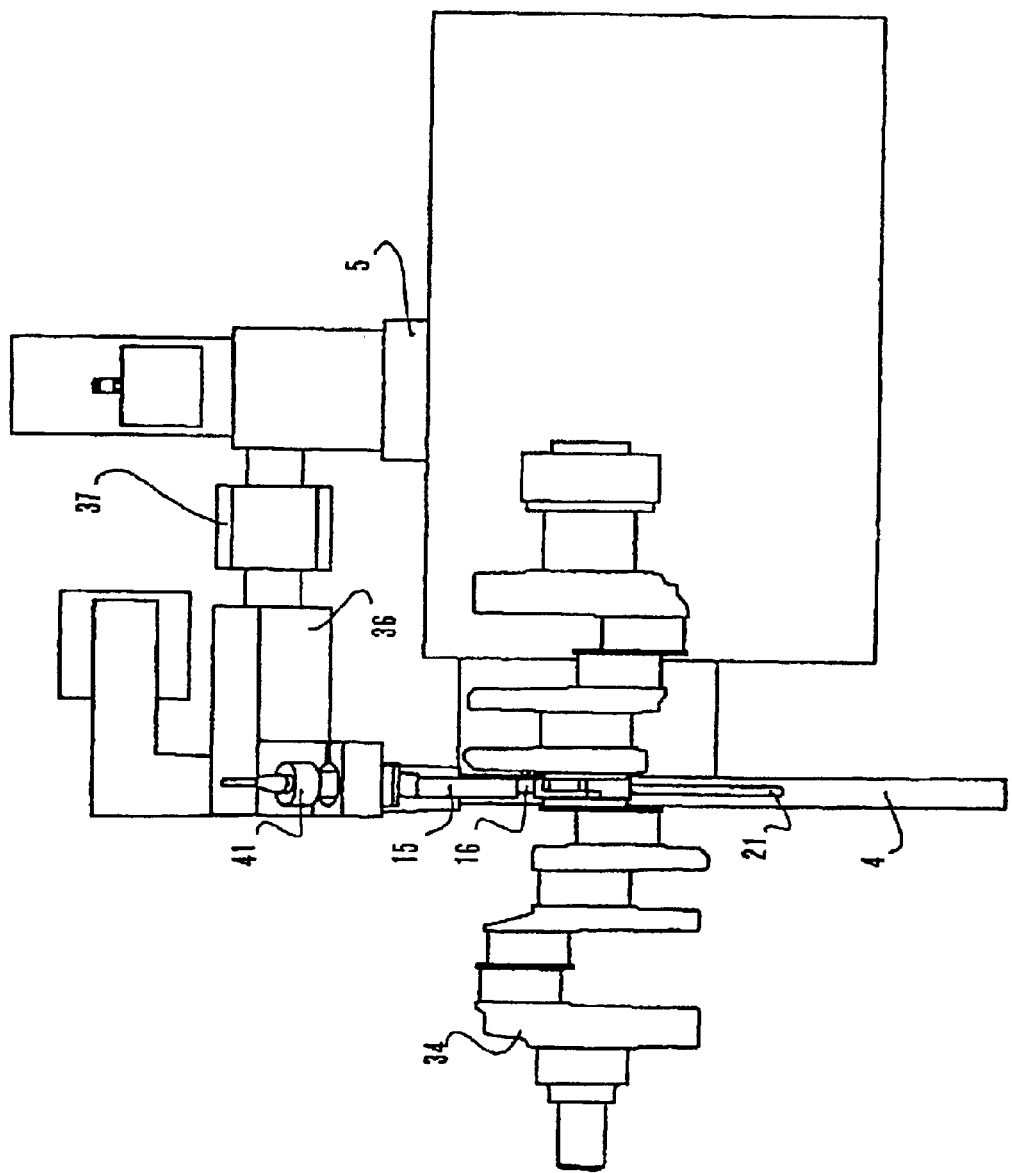
FIG. 3 is a partial front view of the apparatus mounted on the grinding wheel slide of the grinding machine.

With reference to FIGS. 1 to 3, the grinding wheel slide 1 of a computer numerical control ("CNC") grinding machine—for grinding a crankshaft 34 defining an axis of rotation 8—supports a spindle 2 that defines the axis of rotation 3 of grinding wheel 4. Above spindle 2 the grinding wheel slide 1 carries a support device including a support element 5 and a first rotating, coupling element 9 and a second rotating, coupling element 12. The support element 5, by means of a rotation pin 6 that defines a first axis of rotation 7 parallel to the axis of rotation 3 of grinding wheel 4 and the axis of rotation 8 of the crankshaft 34, supports the first rotating, coupling element 9.

In turn, coupling element 9, by means of a rotation pin 10, defining a second axis of rotation 11 parallel to the axis of rotation 3 of grinding wheel 4 and to the axis of rotation 8 of the crankshaft 34, supports the second rotating, coupling element 12. At the free end of coupling element 12 there is coupled a tubular-shaped guide casing 15 wherein there can axially translate a transmission rod 16 (FIG. 4) carrying a feeler 17 for contacting the surface of the pin to be checked, for example a crankpin 18 or a main journal 38 of the crankshaft 34, as shown in FIGS. 1 and 2, respectively. The tubular-shaped casing 15, the rod 16 and the feeler 17 belong to a measuring, or checking, head 39, that also includes a support block 19, coupled to the lower end of the tubular guide casing 15, for supporting a Vee-shaped reference device 20, adapted for engaging the surface of the pin to be checked, by virtue of the rotations allowed by pins 6 and 10. The transmission rod 16 is movable along the bisecting line of the Vee-shaped reference device 20.

Moreover, the support block 19 supports a guide device 21, that, as described in international patent application published with No. WO-A-9712724, has the purpose of guiding the reference device 20 to engage the pin to be checked and maintain contact with the pin while the reference device 20 moves away from the pin for limiting the rotation of the first 9 and the second 12 coupling elements about the axes of rotation 7 and 11 defined by pins 6 and 10.

Figure 4:
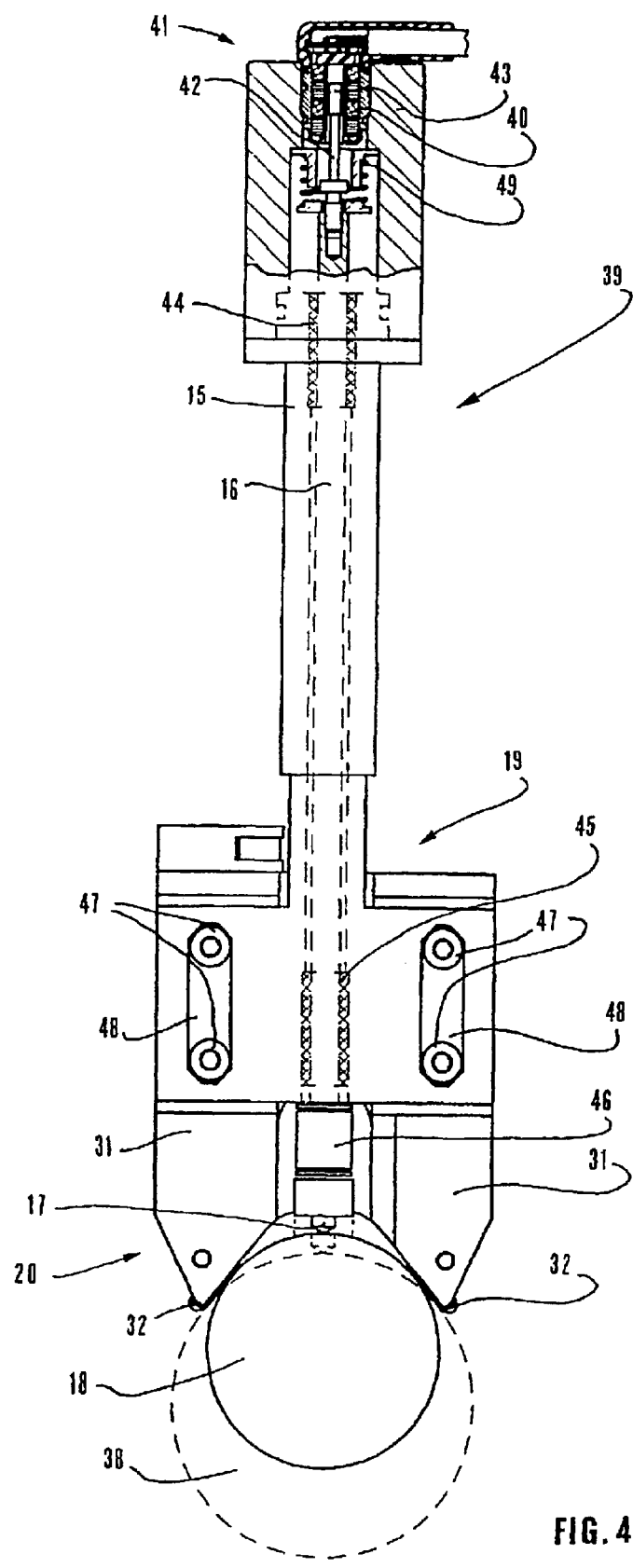
FIG. 4 is a partially cross-sectional view of the measuring system of the apparatus.

The axial displacements of transmission rod 16 with respect to a reference position are detected by a measurement transducer, fixed to casing 15, for example a transducer 41 of the LVDT or HBT type (per se known), with fixed windings 40 and a ferromagnetic core 43 coupled to a rod 42, movable with the transmission rod 16 (FIG. 4). The axial displacement of the transmission rod 16 is guided by two bushings 44 and 45, arranged between casing 15 and rod 16 and a compression spring 49 urges rod 16 and feeler 17 towards the surface to be checked of crankpin 18 or main journal 38 or, in the absence of such surface, towards a rest position of feeler 17 defined by abutment surfaces not shown in the figures. A metal bellows 46, stiff with respect to torsional forces, having its ends fixed to rod 16 and casing 15, respectively, accomplishes the dual function of preventing rod 16 from rotating with respect to casing 15 (thus preventing feeler 17 from undertaking improper positions) and sealing the lower end of casing 15. The support block 19 is secured to guide casing 15 by means of pairs of screws 47 passing through slots 48 and supports reference device 20, consisting of two elements 31 with sloping surfaces, whereto there are secured two bars 32. The rest position of feeler 17 can be adjusted by means of screws 47 and slots 48.

The transducer 41 of the head 39 is connected to a processing and display device 22, in turn connected to the computer numerical control 33 of the grinding machine.

The crankshaft 34 to be checked is positioned on the worktable 23, between a headstock and a tailstock, not shown, that define the axis of rotation 8, coincident with the main geometrical axis of the crankshaft 34. The crankpin 18 (shown in FIG. 1) and the main journal 38 (shown in FIG. 2) rotate about axis 8, the first of the two by describing an orbital trajectory.

Basically, the coupling elements 9 and 12 are linear arms with geometric axes lying in transversal planes with respect to the axis of rotation 8 of the crankshaft 34 and the axis of rotation 3 of grinding wheel 4. However, as shown in FIG. 3, that also illustrates the crankshaft 34, for avoiding any possible interference with elements and devices of the grinding machine, for example with component parts of a coolant plant for directing, by means of a nozzle, coolant towards the surface being machined, the coupling elements 9 and 12 include portions 36 and 37 that extend in a longitudinal direction and portions offset in a plurality of transversal planes.

A control device includes a double-acting cylinder 28, for example of the hydraulic type. Cylinder 28 is supported by grinding wheel slide 1 and includes a rod 29, coupled to the piston of the cylinder, carrying at the free end a cap 30. An arm 14 has one end coupled to element 9 and carries, at the other end, an abutment with an idle wheel 26. When cylinder 28 is activated for displacing the piston and the rod 29 towards the right (with reference to FIGS. 1 and 2), cap 30 abuts against the idle wheel 26 to displace the checking apparatus to a rest position according to which reference device 20 is no longer in contact with the surface of the pin. An overhang 13 is coupled in a rigid way to support element 5, and a coil return spring 27 is coupled to overhang 13 and arm 14. When rod 29 retracts for enabling the apparatus to displace to the checking condition, and cap 30 disengages from the abutment, or idle wheel 26, support block 19 approaches crankpin 18 (or main journal 38) through rotations of the coupling elements 9, 12 and the apparatus reaches and maintains the checking condition, substantially in the way described in the hereinbefore mentioned international patent application published with No. WO-A-9712724.

The cooperation between crankpin 18 (FIG. 1) or main journal 38 (FIG. 2) and the reference device 20 is maintained thanks to displacements of the components caused by the force of gravity. The action of coil spring 27, the stretching of which increases as the support block 19 lowers, partially and dynamically counterbalances, in the embodiment shown in FIGS. 1 and 3, the forces due to the inertia of the component parts of the checking apparatus that displace by following the displacements of the crankpin 18. In this way it is possible, for example, to avoid high thrusts between the reference device 20 and the crankpin 18, at the lower position (identified by reference number 18"), that could cause the deformation of the Vee of the reference device 20. On the other hand, since during the raising displacement of the apparatus (due to the rotation of the crankpin towards the upper position 18') the pulling action of spring 27 decreases, the forces of inertia that, at the upper position 18', tend to release the engagement between the Vee-shaped reference device 20 and crankpin 18, can be properly counterbalanced. In this latter case it should be realized that the balancing action is achieved by diminishing the pulling force of spring 27. In other words, return spring 27 does not cause any force between reference device 20 and crankpin 18, that mutually cooperate, as previously mentioned, simply owing to the force of gravity.

In the course of the checking phase, transducer 41 in head 39 sends signals to the processing and display device 22. The signals are indicative of the position of feeler 17, the displacements of which are transmitted by transmission rod 16. In the device 22, also including a memory unit 24, the signals arriving from head 39 are processed and corrected on the basis of values or compensation coefficients stored in unit 24, and measuring signals are displayed and transmitted to the computer numerical control 33. More specifically, the former values/coefficients can be utilized for compensating linearity errors of the signal output by transducer 41 and/or alterations of the latter as a consequence of thermal variations.

As far as the linearity errors are concerned, in the course of the calibration of transducer 41, before its assembly in head 39, and causing changes in the operative position (i) of core 43 within windings 40, a sequence of values $y_i$ relating to the signal output by transducer 41 is detected, as well as a sequence of values $x_i$ that identify corresponding positions of core 43, the latter values are obtained by utilizing specific testing equipment of a known type. These sequences $x_i$ and $y_i$ are stored, for example in a tabular form, in memory unit 24, in a known and herein not further illustrated way.

The processing unit 22 processes the former sequences, in order to determine correction coefficients and values for compensating the linearity errors of transducer 41.

A possible procedure for determining these coefficients and values is hereinafter described.

Figure 5:
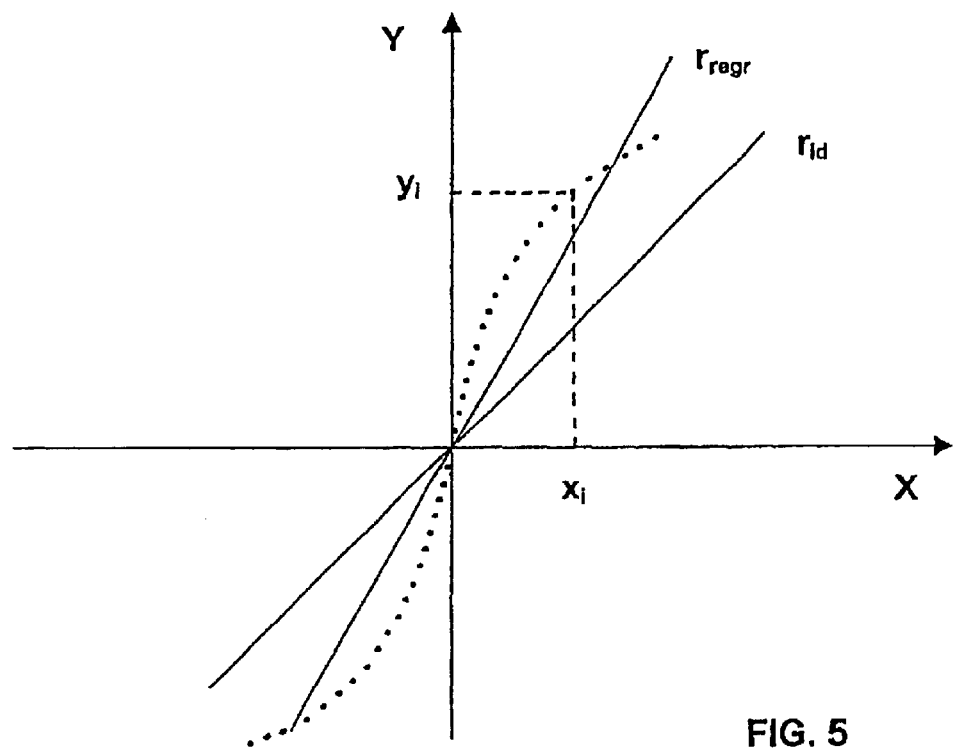
FIGS. 5 and 6 are graphs showing a possible method for determining correction coefficients and values of the linearity error of the transducer.
Figure 6:
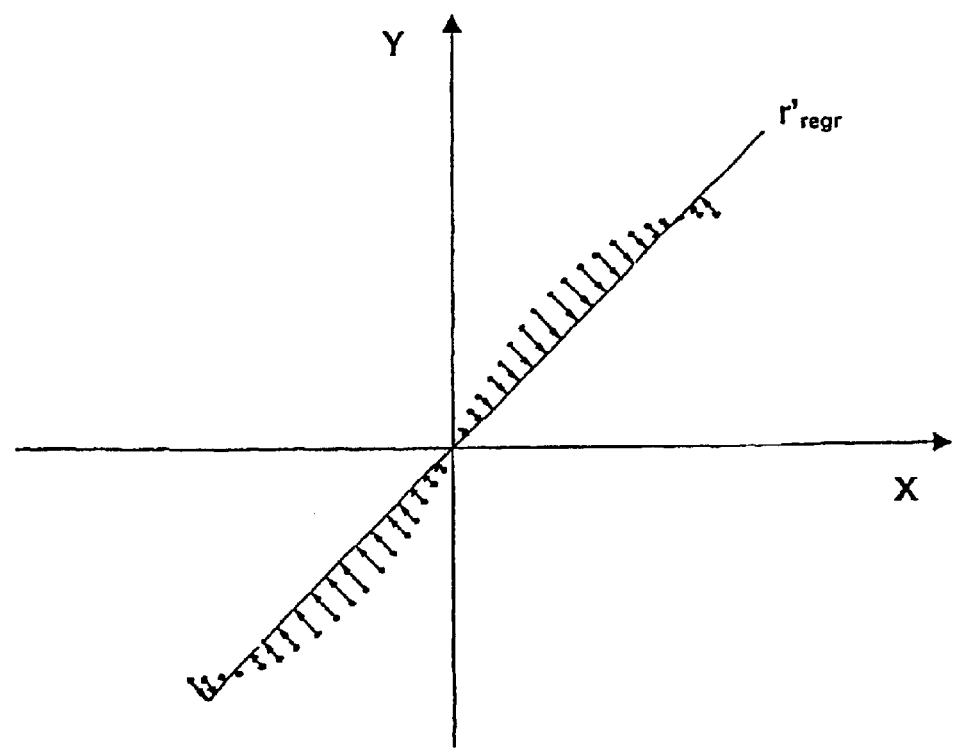

Starting from the sequences of values $x_i$, $y_i$, stored in memory unit 24, it is determined, by applying the least squares method, the regression straight line $r_{regr}$ of the values $y_i$ detected by transducer 41 with respect to those $x_i$ measured by means of the testing equipment. FIG. 5 shows, in a plane X-Y, the points corresponding to pairs of values $x_i$ and $y_i$ detected in the course of the testing phase, the regression line $r_{regr}$ and the ideal line $r_{id}$ of equation y=x that would be obtained in the event the positions $y_i$ detected by the transducer were identical to those $x_i$ measured by means of the testing equipment. In general, owing to sensitivity errors of the transducer, the regression line $r_{regr}$ does not coincide with the line $r_{id}$, but has a different gradient with respect to the latter. The sensitivity error can be indicated as the difference between the angular coefficients of the regression line $r_{regr}$ ($k_{regr}$) and of the ideal line $r_{id}$, the latter being equal to 1. Since $$y_{id}:1=y_{regr}:k_{regr}$$

where $y_{id}$ and $y_{regr}$ represent the ordinates y of points of the straight lines $r_{id}$ and $r_{regr}$, respectively, corresponding to a same generic value x, for compensating the sensitivity error it is necessary to divide the value of ordinate y of every point of the regression line $r_{regr}$ by the angular coefficient $k_{regr}$ of the regression line $r_{regr}$ itself. This compensation can be represented as a rotation of the regression line $r_{regr}$ till it overlaps with the ideal line $r_{id}$, as indicated by reference $r'_{regr}$ in FIG. 6.

In addition to compensating the sensitivity error, by dividing all the ordinates y of the regression line $r_{regr}$ by the angular coefficient $k_{regr}$ of the regression line $r_{regr}$, it is also necessary to compensate the linearity errors represented by the distances of the points of co-ordinates $x_i$, $y_i$ from the regression line $r_{regr}$. Consequently, in order to achieve the compensation, it is necessary to add, to the values detected by the transducer, the identical and opposite values of their associated linearity errors, as indicated by the arrows in FIG. 6.

The coefficients and the correction values determined in this way for a discrete number of points are memorized in memory unit 24, for example in a tabular form. In the course of the checking operations, the transducer 41 signal is corrected in processing unit 22 on the basis of such compensation coefficients and values. As these coefficients and values are indicative of the linearity errors at a discrete, although possibly high, number of reciprocal positions between core 43 and windings 40 of transducer 41, it is furthermore possible to process the values, in a known way, by interpolation, for compensating the output signal of transducer 41 in a substantially continuous way within the entire operation range of head 39.

As an alternative to the defining and the storing of the compensation values in a tabular form, the error values detected during the calibration phase can be processed for obtaining a compensation curve, and the coefficients of its polynomial (typically of the 3rd degree) can be stored in memory unit 24.

The above described procedure enables to achieve, without modifying the mechanical characteristics of the transducer 41, a wider measurement range while accuracy remains substantially unaltered.

The compensation values or coefficients can be stored, for example, on the basis of detectings carried out in the course of the calibration of transducer 41 on testing equipment, before the assembly in head 39, as previously described. As an alternative, the values stored in unit 24 can be obtained by statistical processings of data detected during the testing of a certain number of sample transducers that belong to a same "family", in other terms that have common manufacturing characteristics (dimensions and other).

Figure 7:
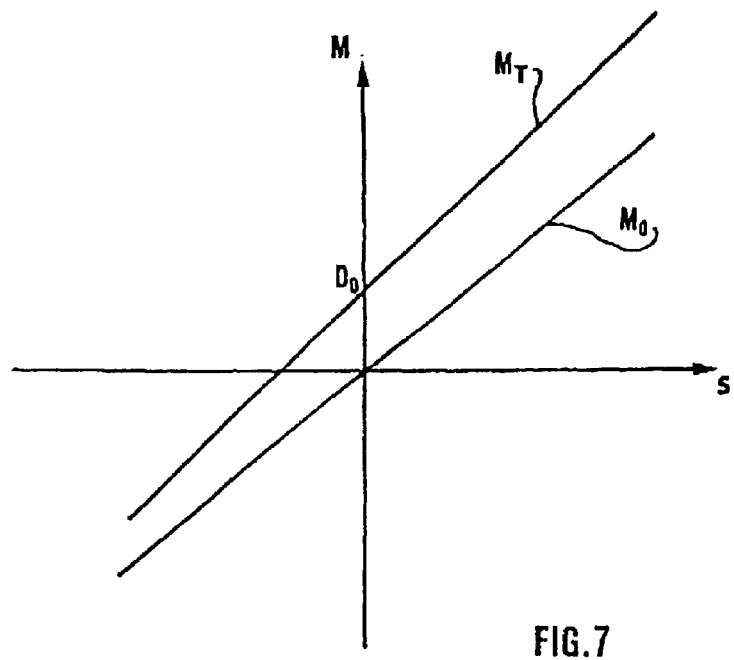
FIG. 7 is a graph showing the variations—caused by thermal variations—in the output signal of the head of an apparatus according to the invention.

Another possible compensation regards the repeatability errors of head 39 generated by temperature variations that cause alterations of the characteristics of transducer 41. More specifically, as schematically shown in FIG. 7, where axis s stands for the displacement of the feeler 17 and axis M indicates the measurement detected on the basis of the output signal of transducer 41, the straight line $M_0$ represents the measurement detected as the displacement s varies at a reference temperature $t_0$, and straight line $M_T$ represents the same measurement at a reference temperature $t_T$ other than $t_0$.

The straight lines are bound by the following equation:

$$M_T = M_0 + [k_1(t_T - t_0)] + [M_0 k_2(t_T - t_0)]$$

that does not consider terms of a higher order, which are generally negligible.

The term $[k_1(t_T - t_0)]$, or "zero drift", indicates the measurement variation, as the temperature varies, at the zero position of transducer 41 (s=0) and is identified by reference $D_0$ in FIG. 7.

The term $[k_2(t_T - t_0)]$, or "sensitivity drift", indicates the measurement variation caused by variations in the transducer sensitivity as the temperature varies.

With reference to FIG. 7, it can be stated that the term $[k_1(t_T - t_0)]$ indicates the distance between the two straight lines $M_T$ and $M_0$ at s=0, while $[k_2(t_T - t_0)]$ indicates the angle formed by the two straight lines.

The values of the coefficients $k_1$ and $k_2$, that enable to obtain the trend of the measurement $M_T$ when the reference straight line $M_0$ and the temperature difference $(t_T - t_0)$ are known, are detected in an experimental way during the calibration of transducer 41. As already described with regard to the compensation of the linearity errors of transducer 41, in this case too the values of coefficients $k_1$ and $k_2$ can be individually detected and employed for each single transducer 41, or detected on the basis of statistical processing—in particular as mean values of the data relating to a certain number of sample transducers that have common manufacturing characteristics—and are utilized for compensating any head (39) with any whatsoever transducer (41) provided with these characteristics. Both the methods provide worthy improvements in the repeatability of the heads 39, even though, obviously, the improvements provided in the first case are more evident. In order to compensate the errors due to thermal variations, it is mandatory, as already mentioned, to detect the temperature variation $(t_T - t_0)$ with respect to a reference temperature. For this purpose it is possible to use a temperature sensor of a known type (for example, a "thermistor") inserted in head 39.

As an alternative, data relating to the temperature variation can be obtained by employing the components of the position transducer 41 for detecting variations in the electric resistance of the windings 40 and processing these variations with data that identify the characteristics of the material from which the windings 40 are made. More specifically, the temperature variation can be calculated in the following way $$(t_T - t_0) = (R_T - R_0)/\alpha$$

where ($R_T$–$R_0$) is the resistance difference of the windings 40 of the transducer 41 at temperature t, with respect to a reference temperature, and α is a constant that depends on the type of material.

Figure 8:
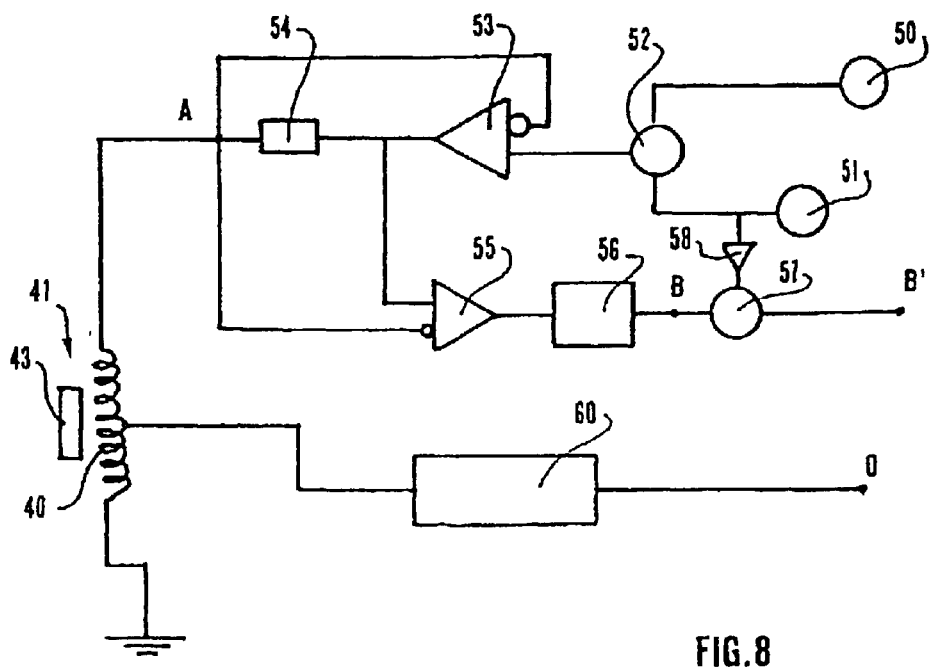
FIG. 8 is a circuit block diagram showing some components of a processing system according to the invention.

FIG. 8 schematically shows the power supply and processing circuits that can be utilized, in processing device 22, with transducer 41, the latter being, for instance, of the so-called "half bridge" type. FIG. 8 shows a source of alternating voltage 50 and a source of direct voltage 51, an adder 52, a drive circuit 53 with a shunt resistance 54, an amplifier 55, a low pass filter 56, a second adder 57, and circuits 60 for conditioning the output signal of transducer 41.

An alternating voltage $V_{AC}$ for the power supply of the transducer and a direct voltage $V_{DC}$ are provided by sources 50 and 51, respectively, and added in adder 52. At point A the voltage is kept substantially constant by drive circuit 53. The variations in the value of resistance R of windings 40 as the temperature changes cause current variations and the consequent voltage drop at the ends of the shunt resistance 54 that is amplified (55) and filtered (56) to eliminate the alternating component. An offset voltage value $V_{OS}$, obtained from the direct voltage generated by source 51, is subtracted (57,58) from the voltage so obtained.

The variations of the resistance R of the windings 40 as the temperature changes cause consequent changes in the voltage at point B: therefore by periodically detecting the latter voltage it is possible to calculate the resistance variation ($R_T$–$R_0$) with respect to a reference value and to get the temperature change with respect to a reference value $t_0$ corresponding to resistance $R_0$.

The calculation ($R_T$–$R_0$) made on the basis of the voltage difference detected at point B. involves known quantities like the value of the offset voltage $V_{OS}$, the gain of the circuits 53 and 55 and the value of resistance 54, according to equations herein not provided for the sake of simplicity.

The conditioning circuits 60 provide the output signal of the transducer 41 at point O and are of a known type herein not described in detail.

When a new crankpin 18 (or main journal 38) has to be machined, it is brought in front of grinding wheel 4, usually by displacing the worktable 23 (in the event of a grinding machine with a single grinding wheel), and the checking apparatus moves to a measuring position, i.e. the head 39 is displaced onto a new pin to be checked, as hereinbefore described.

Thanks to the compensation in the processing and display unit 22, in particular relating to the linearity errors of transducer 41, the measurement range of head 39 is particularly wide. In other words, it is wide the range of the possible displacements of feeler 17 that correspond to substantially linear variations of the measuring signals output by processing unit 22. This enables to program the sequential and automatic machining of pins that have different nominal dimensions (for example crankpin 18 shown in FIG. 1 and main journal 38 of FIG. 2) without there being the need to perform cycles for zero-setting the head 39 against master pieces with various nominal dimensions representing those of the various pins. Instead, an initial zero-setting on a piece with just a known dimension (obviously within the measurement range of head 39) is sufficient for enabling, thereafter, the machining—under the control of the computer numerical control 33—of pins with nominal dimensions that vary within the wide range of head 39. The proper mechanical cooperation between feeler 17 and the surface of pin (18 or 38) is provided by virtue of the Vee-shape of the reference device 20 and the arrangement of the feeler 17 and the transmission rod 16, substantially along the bisecting line of the Vee-shaped reference device (or along a direction with a slight angular arrangement with respect to such bisecting line).

According to one of the various possible embodiments of the invention, a substantially linear measuring signal can be obtained, by means of transducer 41 and associated compensations in unit 22, within a range wider than 4 mm. This enables to check, in combination with the geometric characteristics of the Vee-shaped reference device 20, the machining of pins with a nominal diameter varying within a range that can be wider than 20 mm. FIG. 4 clearly shows the ratio existing among the various positions of feeler 17 and the corresponding various dimensions of pins 18 and 38. On the other hand, the wide linearity range of the measuring signal enables to achieve a wide measurement range of head 39 insofar as Vee-shaped reference devices 20 with considerably different opening angles are concerned. In other words, it is possible to choose the opening angle of the Vee-shaped device 20 on the basis of various technical characteristics of the application without significantly affecting the measurement range of the head 39 that, even though it varies, in any case will remain definitely high.

Thus, the innovative aspects of an apparatus according to the invention are evident and basically regard the shape of the reference device 20 and the compensation of the linearity errors of transducer 41 and/or of errors due to temperature variations, which are characteristics that, although individually known, in combination enable to achieve a remarkable technical result.

Apparatuses according to the invention can include other manufacturing aspects with respect to what has been so far illustrated and described, among other things with regard to the component parts of the support device, that need not necessarily rotate, and the guide device 21, that can be left out or manufactured in a different way, so as to include, for example, surfaces for cooperating with the coupling elements of the support device and not with the part to be checked.

What is claimed is:

1. An apparatus for checking the diameter of pins, rotating about a geometrical axis, in the course of the machining in a numerical control grinding machine including a worktable, defining said geometrical axis, and a grinding wheel slide carrying a grinding wheel, the apparatus comprising:

a measuring head including a Vee-shaped reference device for cooperating with the pins to be checked, said Vee-shaped reference device having an opening angle, a feeler for contacting surfaces of the pins to be checked and performing translation displacements substantially along the bisecting line of the Vee-shaped reference device, and a transducer for generating signals depending on the position of the feeler with respect to the Vee-shaped reference device, said opening angle of the Vee-shaped reference device being a factor in defining a measurement range for said measurement head, a support device, adapted to be coupled to the grinding wheel slide, including reciprocally movable coupling elements, for supporting the measuring head in a movable way, a control device for controlling automatic displacements of the measuring head from a rest position to a checking condition and vice versa, and a processing and display device connected to the measuring head for receiving and processing the signals provided by the transducer, wherein the processing and display device includes a memory unit for storing compensation values or coefficients relevant to linearity errors of the transducer, said compensation values or coefficients being also a factor in defining said measurement range for said measuring head, the processing and display device being adapted to process the transducer signals and corresponding compensation values or coefficients and provide measuring signals.

2. The apparatus according to claim 1, including a temperature sensor, wherein said compensation values or coefficients are also relevant to errors of the transducer due to thermal variations, the processing and display device being connected to the temperature sensor.

3. The apparatus according to claim 2, wherein said temperature sensor includes circuit components of the transducer.

4. The apparatus according to claim 1, wherein the transducer is an inductive type transducer.

5. The apparatus according to claim 1, wherein the measuring head includes a guide casing secured to the support device and a transmission rod axially movable within the guide casing, the feeler being coupled to an end of said transmission rod, the transducer having a movable element coupled to the other end of the transmission rod.

6. The apparatus according to claim 1, for checking the diameter of crankpins rotating with orbital motion about said geometrical axis, wherein, in the course of said checking condition of the head, the Vee-shaped reference device remains in contact with the crankpin to be checked substantially due to the force of gravity.

7. A method of checking the diameter of pins, comprising:
providing an apparatus for checking the diameter of pins, said apparatus having a processing and display device connected to a measuring head, said measuring head having a Vee-shaped reference device having an opening angle being a factor in defining a measurement range for said measurement head, a transducer and a feeler;

generating signals with said transducer, said generated signals corresponding to positions of said feeler with respect to said Vee-shaped reference device; and receiving and processing said signals generated by said transducer with said processing and display device, said processing and display device having a memory unit for storing compensation values or coefficients corresponding to said signals received from said transducer, said compensation values or coefficients being also a factor in defining said measurement range for said measuring head;

wherein the compensation values or coefficients are obtained during a calibration phase of said transducer on testing equipment, and the compensation values or coefficients are stored in said memory unit of the processing and display device.

8. A method for checking the diameter of pins, comprising:
providing an apparatus for checking the diameter of pins, said apparatus having a processing and display device connected to a measuring head, said measuring head having a Vee-shaped reference device, said Vee-shaped reference device having an opening angle, a transducer and a feeler;

generating signals with said transducer of the measuring head, said generated signals corresponding to positions of said feeler with respect to said Vee-shaped reference device;

receiving and processing said signals generated by said transducer of the measuring head with said processing and display device, said processing and display device having a memory unit for storing compensation values or coefficients corresponding to said signals and relevant to linearity errors of said transducer of the measuring head;

wherein the compensation values or coefficients are obtained during a calibration phase, and the compensation values or coefficients are stored in said memory unit of the processing and display device, both said Vee-shaped reference device and said compensation values or coefficients being a factor in defining a measurement range for said measuring head.

9. The method according to claim 8, wherein said calibration phase is performed on said transducer of the measuring head, and before assembling the transducer in the measuring head.

10. The method according to claim 8, wherein said calibration phase is performed on at least one sample transducer, different from said transducer of the measuring head, having the same manufacturing characteristics as said transducer of the measuring head.

11. The method according to claim 10, wherein the compensation values or coefficients are obtained by means of statistical processing of data detected during a calibration phase of a plurality of sample transducers on said testing equipment.

12. The method according to claim 8, wherein said apparatus includes a temperature sensor connected to the processing and display device, the calibration phase providing compensation values or coefficients relevant also to errors of the transducer of the measuring head due to thermal variations.

* * * * *

UNITED STATES PATENT AND TRADEMARK OFFICE
CERTIFICATE OF CORRECTION

PATENT NO. : 6,931,749 B2
DATED : August 23, 2005
INVENTOR(S) : Carlo Dall'Aglio It is certified that error appears in the above-identified patent and that said Letters Patent is hereby corrected as shown below:

Column 7,
Line 33, delete "." after "B".

Column 8,
Line 42, delete "the" after "of" and before "machining".

Column 10,
Line 44, delete "said" after "on" and before "testing".

Signed and Sealed this

Thirteenth Day of June, 2006

JON W. DUDAS
*Director of the United States Patent and Trademark Office*